United States Patent [19]

Koga

[11] Patent Number: 5,181,146
[45] Date of Patent: Jan. 19, 1993

[54] APPARATUS FOR DIGITALLY RECORDING AND REPRODUCING VIDEO AND AUDIO SIGNALS IN SKEWED TRACKS ON A RECORD TAPE

[75] Inventor: Hirohisa Koga, Kanagawa, Japan

[73] Assignee: Sony Corporation, Tokyo, Japan

[21] Appl. No.: 421,063

[22] Filed: Oct. 13, 1989

[30] Foreign Application Priority Data

Oct. 18, 1988 [JP] Japan .................. 63-261860

[51] Int. Cl.$^5$ .................. G11B 5/02; H04N 5/78
[52] U.S. Cl. .................. 360/19.1; 360/10.1; 360/77.16; 360/64; 358/310
[58] Field of Search .................. 360/19.1, 84, 10.1, 360/10.2, 10.3, 77.12, 77.16, 78.02, 64; 358/310, 14, 15

[56] References Cited

U.S. PATENT DOCUMENTS

| | | | |
|---|---|---|---|
| 4,197,562 | 4/1980 | Kikuya et al. | 360/64 X |
| 4,462,049 | 7/1984 | Heitmann | 360/77.16 X |
| 4,549,235 | 10/1985 | Sakamoto | 360/10.2 |
| 4,839,750 | 6/1989 | Kato et al. | 360/48 |
| 4,855,843 | 8/1989 | Ive | 360/10.2 |
| 4,924,325 | 5/1990 | Yamashita | 360/77.16 X |
| 4,939,605 | 7/1990 | Heitmann et al. | 360/19.1 |

FOREIGN PATENT DOCUMENTS

A0177231 9/1986 European Pat. Off. .
0150476 7/1986 Japan .
62-236104 10/1987 Japan .

OTHER PUBLICATIONS

Introduction to the 4:2:2 Digital Video Tape Recorder 1988, pp. 48-65 Pentech Press Ltd. London.
SMPTE Journal, vol. 96, No. 10, Oct. 1987 pp. 949-959, C. Chan et al. "Product Implementation of the 4:2:2 Digital Format".

Primary Examiner—Andrew L. Sniezek
Attorney, Agent, or Firm—Alvin Sinderbrand; William S. Frommer

[57] ABSTRACT

In an apparatus for digitally recording and reproducing video and audio signals in successive parallel slant record tracks on a record tape; pluralities of recording heads are mounted on a rotary drum at diametrically opposed positions so that one field of a video signal is recorded in a plurality of the tracks scanned by the recording heads as the record tape is advanced at a predetermined speed, a pair of bimorph leaves are mounted at respective opposed positions on the rotary drum, a plurality of reproducing heads are disposed on each of the bimorph leaves to be deflected by the respective bimorph leaf in a direction transverse to the direction along the record tracks when, in a reproducing mode, the tape is advanced at a speed different from the predetermined speed used for recording, and the number of the reproducing heads is greater than, for example, twice, the number of the recording heads for relatively reducing the maximum deflections of the reproducing heads by the bimorph leaves needed to achieve substantial tracking of the record tracks while the tape is advanced at such different speed.

7 Claims, 2 Drawing Sheets

APPARATUS FOR DIGITALLY RECORDING AND REPRODUCING VIDEO AND AUDIO SIGNALS IN SKEWED TRACKS ON A RECORD TAPE

BACKGROUND OF THE INVENTION

1. Field of the Invention

This invention relates generally to an apparatus for recording and reproducing video and audio signals and, more particularly, is directed to such an apparatus suitable for application to a digital video tape recorder (DVTR).

2. Description of the Prior Art

Recently, the SMPTE "D-1 Format" has been adopted as an international standard for the digital recording of a conventional 4:2:2 component-type video signal in a digital video tape recorder. Reference is made to "Introduction to the 4:2:2 Digital Video Tape Recorder", published 1988 by Pentech Press Limited, London, for a detailed description of the conventional 4:2:2 digital video tape recorder, and more particularly for a detailed description of the tape format and the arrangements of the recording and reproducing heads used in such digital video tape recorder. However, for the purposes of understanding problems overcome by the present invention, it is sufficient to note that, as shown diagrammatically on FIG. 1, in accordance with the SMPTE D-1 format, digital video and audio signals are recorded on a magnetic tape T in successive parallel slant tracks A, B, C and D extending obliquely across the magnetic tape. Each such helical or slant track on the magnetic tape T is comprised of two video sectors indicated at V1 and V2 and an intervening area AU for the recording of digital audio data.

In view of the large amount of data that needs to be recorded for each field of a video signal, it is not practical to digitally record a field on a single, unsegmented helical or slant track. Accordingly, in accordance with the D-1 format, a mixture of field segmentation and channel distribution are employed for recording each field in a number of the slant tracks so as to maintain within reasonable limits the amount of data that needs to be recorded in each slant track and hence the length of the latter. For example, for digitally recording a video signal of the NTSC or 525/60-System according to the D-1 format or standard, only the last 250 lines of each field are recorded, and 10 helical or slant tracks are employed for recording the information of one field. The 250 lines of a field are first divided into five segments, each consisting of fifty lines, so that two of the ten tracks employed for recording a field of video signals are available for each segment. Further, in order to ensure minimum sensitivity of the recorded signal to tape defects, such as dropouts and the like, the incoming video signal is distributed amount four adjacent tracks. For making the foregoing possible, the previously mentioned video sectors V1 and V2 are formed within each helical or slant track, and each segment of the video signal data is recorded in two pairs of video sectors located in four adjacent helical tracks, for example in the upper adjacent video sectors V2 of the first pair of tracks A and B at the left-hand side of FIG. 1 and the lower adjacent video sectors V1 of the next pair of tracks C and D.

In the case of the digital recording of a component video signal of the PAL or 625/50-System according to the SMPTE D-1 format, the data for each field of the video signal are similarly subjected to field segmentation and distribution among four channels so that, as shown on FIG. 1, the data for each field of the video signal is recorded in the twelve successive slant tracks indicated in solid lines on the drawing.

For recording audio and video signals of the PAL system according to the D-1 format illustrated on FIG. 1, a conventional digital video tape recorder (DVTR) employs two pairs of rotary magnetic heads mounted at diametrically opposed locations on a tape guide drum, with the two magnetic heads of each pair being mounted close to each other in substantially side-by-side relation so as to simultaneously scan respective adjacent slant tracks on the tape. During recording, the tape T is advanced or transported at a predetermined standard speed in the direction of the arrow t, while the rotary magnetic heads scan the tape in the direction of the arrow h. The magnetic tape T is wound around a portion of the periphery of the tape guide drum which includes a tape-wrapping angle of approximately 260°. Each pair of the rotary magnetic heads is supplied with video signal data for recording in the lower video sectors V1 of the adjacent slant tracks being scanned by the heads while traversing the initial 120° of the tape-wrapping angle, whereupon audio signal data is supplied to the rotary magnetic heads during the scanning thereby of the next 20° of the tape-wrapping angle, and finally video signal data is again supplied to the rotary magnetic heads during the scanning of the tape over the final 120° of the tape-wrapping angle.

In the reproducing or playback mode of the standard DVTR, the digital video and audio signals thus recorded on the magnetic tape are reproduced by two pairs of rotary magnetic heads mounted on the tape guide drum at diametrically opposed locations, and which may be the same as the rotary magnetic heads used for recording. It will be appreciated that the rotary magnetic heads used for reproducing or playback of the video signal data recorded in the sectors V1 and V2 of the slant tracks respectively scanned thereby are also used for reproducing the audio signal data recorded in the respective audio areas AU which also have recorded therein time code signals for identifying the video signal data recorded in the respective tracks. During recording and normal playback or reproducing, one pair of the rotary magnetic heads located adjacent each other scans the slant tracks A and B simultaneously during the rotation of the tape guide drum through 180°, and the other pair of the rotary magnetic heads located adjacent to each other then scans the slant tracks C and D simultaneously during the turning of the tape guide drum through the next 180°.

In the case of the digital recording of video and audio signals of the PAL system, as indicated by the solid lines on FIG. 1, one field of the digital video signal is recorded during three revolutions of the tape guide drum starting from the upper video sectors V2 of the 1st and 2nd slant tracks A and B at the left-hand side of FIG. 1, and terminating at the lower video sectors V1 and the audio areas AU of the 13th and 14th slant tracks A and B, also counted from the left-hand side of FIG. 1.

With the above generally described standard DVTR, the recording and reproducing of high quality video and audio signals according to either the PAL system or the NTSC system are reliably achieved so long as the speed of tape transport used during playback is the same as the standard tape transport speed used during recording. However, if a variable tape speed is used during playback or reproducing, the quality of the resulting displayed picture may be deteriorated.

In the case of conventional analog VTRs, for example, of the type employing the C-format, if playback is effected with a tape transport speed different from that used for recording, each reproducing rotary magnetic head scans the magnetic tape T along a path intersecting a plurality of the slant tracks in which different fields of video information are recorded. By reason of the foregoing, when the reproduced signal is displayed on a monitor, several horizontal band-shaped noise patterns appear in the reproduced picture. In order to achieve variable tape speed playback without the generation of a noise component in the reproduced signal, it is known in the prior art to provide an analog video tape recorder, for example, as disclosed in U.S. Pat. No. 4,549,235, having a common assignee herewith, in which a reproducing rotary magnetic head is mounted on a head moving device, such as, a bimorph leaf, so that the reproducing rotary magnetic head can be displaced in the direction transverse to the slant track being scanned thereby. Thus, during playback with a tape transport speed different from that used in recording, a suitable head deflecting signal is applied to the bimorph leaf for ensuring that the respective reproducing rotary magnetic head accurately scans or tracks a slant track on the magnetic tape.

Referring now to FIG. 2, it will be seen that in applying the above teaching to a conventional 4:2:2 DVTR, a first pair of reproducing magnetic heads P(A) and P(B) and a second pair of reproducing magnetic heads P(C) and P(D) are mounted on bimorph leaves BM1 and BM2, respectively. The leaves BM1 and BM2 are mounted on a rotary drum DR in diametrically opposed directions so as to locate the respective reproducing magnetic heads at substantially equally angularly spaced positions relative to a first pair of recording heads R(A) and R(B) and a second pair of recording heads R(C) and R(D) which are fixedly mounted at diametrically opposed locations on the periphery of the drum DR rotated in the direction of the arrow r.

If the conventional 4:2:2 DVTR is used for recording a PAL television signal, one field of such signal is recorded in 12 tracks on the tape T, as shown in FIG. 3. Since each field period of a PAL television signal is 1/50 second, the rotary drum DR has to be rotated three times during 1/50 second so as to cause the recording heads R(A), R(B), R(C) and R(D) to scan 12 slant tracks on the tape for the recording of one field of the PAL television signal therein. In other words, a rotational speed of 150 r.p.s., or 9,000 r.p.m. is required. The track pitch in the tape format for the standardized 4:2:2 DVTR, for example, the transverse distance between the adjacent tracks A1 and B1 in FIG. 3, is 45 micrometers so that, for the case where one field of a PAL television signal is recorded in 12 tracks on the tape T, the overall pitch or distance along the tape covered by a set of 12 tracks in which one field is recorded is 540 micrometers. Further, in the case of the standardized 4:2:2 DVTR, the tape T is wrapped around a portion of the periphery of the rotary drum DR including an angle of 257.7° so that, in the playback or reproducing mode, each of the bimorph leaves BM1 and BM2 is flexed or deflected while the respective playback heads move through an angular extent of 257.7° and scan respective tracks on the tape, and each of the bimorph leaves BM1 and BM2 is returned to its neutral or unflexed condition while the respective playback or reproducing heads are out of contact with the tape, that is, are moving through the angular extent of 102.3° where the tape is not wrapped about the rotary drum DR.

Considering initially the situation in the twice normal tape speed playback mode, that is, a playback operation in which the magnetic tape is transported at twice the normal tape speed used for recording, it will be appreciated that the playback head P(A) begins scanning a slant track at the point P on FIG. 3 and finishes scanning the first track A1 (counted from the left-hand side of FIG. 3), the fifth A2, the ninth track A1 and the eleventh track A2 at the point Q1. During such scanning by the head P(A), mistracking is avoided by suitable flexing or deflection of the bimorph leaf BM1. The required amount of such flexing of the bimorph leaf at its outer end carrying the respective playback heads is $45 \times 12 \times 257.7/360 = 387$ micrometers. In the still playback mode of the standardized 4:2:2 DVTR, the bimorph leaf BM1 similarly needs to be displaced or deflected by 387 micrometers, but in the direction opposite to the flexing or displacement of the bimorph leaf for the twice normal tape speed playback mode. Thus, the bimorph leaf BM1 has to be capable of a maximum overall or peak-to-peak displacement of 774 micrometers, that is, a displacement of 387 micrometers from its neutral position in each of the opposed directions. Such overall maximum displacement of 774 micrometers can only be realized with substantial difficulty and, in any event, is the upper limit of the displacements that can be achieved with a bimorph leaf of a size that can be mounted on the rotary drum of the standardized 4:2:2 DVTR.

Further, after the signals recorded in the twelve slant tracks from the point P to the point Q1 on FIG. 3 have been reproduced in the twice normal tape speed playback mode, the next twelve successive slant tracks are skipped from the point Q2 on the slant track A1, and then scanning is commenced beginning at a point along the next track A1 which positionally corresponds to the point P on FIG. 3. Thus, the audio areas AU of the tracks indicated at e on FIG. 3 are not reproduced. As earlier noted, in accordance with the SMPTE D-1 format, a time code signal for indicating the tape position is recorded along with the digital audio signal in the audio area AU of each track. Therefore, when the audio areas AU indicated at e on FIG. 3 are jumped or not reproduced, the respective time code signal cannot be read. If the rotational speed of the rotary drum DR is increased so as to permit the time code signal in the audio track areas AU indicated at e to be read within one field period, the increase in rotational speed has to be about 20% so as to accommodate the format of the 4:2:2 component DVTR. Such 20% increase in the rotational speed of the drum DR serves to increase the rotational speed from 9,000 to 10,800 r.p.m., that is, to a speed of 175 r.p.s. When the rotary drum DR rotates at 9,000 r.p.m., the centrifugal force acting on each of the bimorph leaves BM1 and BM2 is about 3,000 G and, when the rotational speed is increased by 20%, the centrifugal force acting on each of the bimorph leaves is $3,000 \times 1.2^2 = 4,200$ G. It has been observed that, when such increased centrifugal force is applied to the bimorph leaf, the maximum possible displacement of the bimorph leaf is reduced from the previously mentioned 774 micrometers to 645 micrometers which is less then the overall displacement required for ensuring proper tracking in the twice normal tape speed mode and the still playback mode.

Further, in the 1.9×normal tape speed playback mode, that is, the reproducing mode in which the tape is transported at 1.9 times the speed used for recording, the trace along which a playback head scans across the tape is increasingly displaced during successive scans from the slant track that should be scanned by such head. For example, the playback head P(A), when starting to scan the first of the group of slant tracks in which one field of a digital video signal is recorded, may be displaced from its desired position by as much as 45×12=540 micrometers. Consequently, the maximum displacement or deflection of the bimorph leaf BM1 needed for maintaining tracking may be 322+540=862 micrometers, which substantially exceeds the maximum displacement that can be achieved with a bimorph leaf of the size that can be employed in a DVTR according to the D-1 format.

Instead of mounting the reproducing rotary magnetic heads on bimorph leaves which are flexed so as to achieve accurate tracking of the slant tracks in a DVTR during variable tape speed playback, that is, when the tape is transported at a speed different from that used for recording, it has been proposed to increase the number of the reproducing rotary magnetic heads fixedly mounted on the rotary drum, for example, by employing eight reproducing rotary magnetic heads in diametrically opposed groups of four, rather than the two pairs of diametrically opposed reproducing rotary magnetic heads previously provided on the rotary drum. In such case, and assuming that each reproducing rotary magnetic head can accurately reproduce a digital video signal recorded in the slant track being scanned thereby so long as the head is not displaced from such slant track by a distance greater than ½ the track pitch, noise-less variable tape speed playback can be achieved when the tape transport speed is within the range from −1 to +1 times the tape transport speed used for recording. In the case of variable tape speed playback with tape transport speeds outside the foregoing range, it is necessary to further increase the number of reproducing rotary magnetic heads if noise-less playback is to be achieved thereby. However, further increasing the number of reproducing rotary magnetic heads is disadvantageous in that it undesirably increases the size of the rotary magnetic head assembly.

OBJECTS AND SUMMARY OF THE INVENTION

Accordingly, it is an object of the present invention to provide an improved apparatus for recording and reproducing video and audio signals, and which avoids the above noted problems associated with the prior art.

More specifically, it is an object of the present invention to provide an apparatus for digitally recording and reproducing video and audio signals in successive parallel slant record tracks on a record tape, and in which relatively noiseless variable tape speed playback of the recorded signals can be achieved over a relatively wide range of tape speeds that differ from the speed of tape transport used for recording.

It is another object of this invention to provide an apparatus for digitally recording and reproducing video and audio signals, as aforesaid, and in which the maximum required displacements of reproducing rotary magnetic heads effected by flexing of respective bimorph leaves for maintaining tracking in the variable tape speed playback mode are reduced.

According to an aspect of the present invention, in an apparatus for digitally recording and reproducing video and audio signals in successive parallel slant tracks on a record tape, pluralities of recording heads are mounted on a rotary drum at diametrically opposed positions so that one field of a video signal is recorded in a plurality of the tracks scanned by the recording heads as the record tape is advanced at a predetermined speed, bimorph leaves are mounted at respective opposed positions on the rotary drum, a plurality of reproducing heads are disposed on each of the bimorph leaves to be deflected by the respective bimorph leaf in a direction transverse to the direction along the record tracks when, in a reproducing or playback mode, the tape is advanced at a speed different from the predetermined speed used for recording, and the number of the reproducing heads is greater than, for example, twice, the number of the recording heads for relatively reducing the maximum deflections of the reproducing heads by the bimorph leaves needed to achieve substantial tracking of the record tracks while the tape is advanced at such different speed.

The above, and other objects, features and advantages of the present invention, will be apparent in the following detailed description of a preferred embodiment when read in conjunction with the accompanying drawings, in which the same reference numerals are used to identify the same or similar parts in the several views.

DETAILED DESCRIPTION OF A PREFERRED EMBODIMENT

Figure 1:
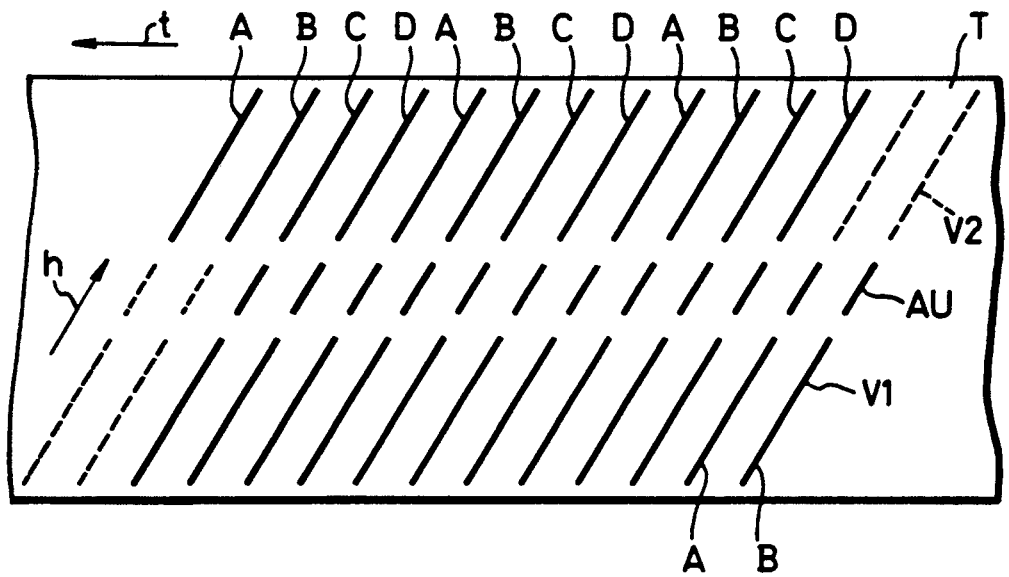
FIG. 1 is a diagrammatic view of a section of magnetic tape on which there are illustrated slant record tracks having video and audio signals recorded therein in accordance with the D-1 format for the SMPTE 4:2:2 component digital video tape recorder.
Figure 2:
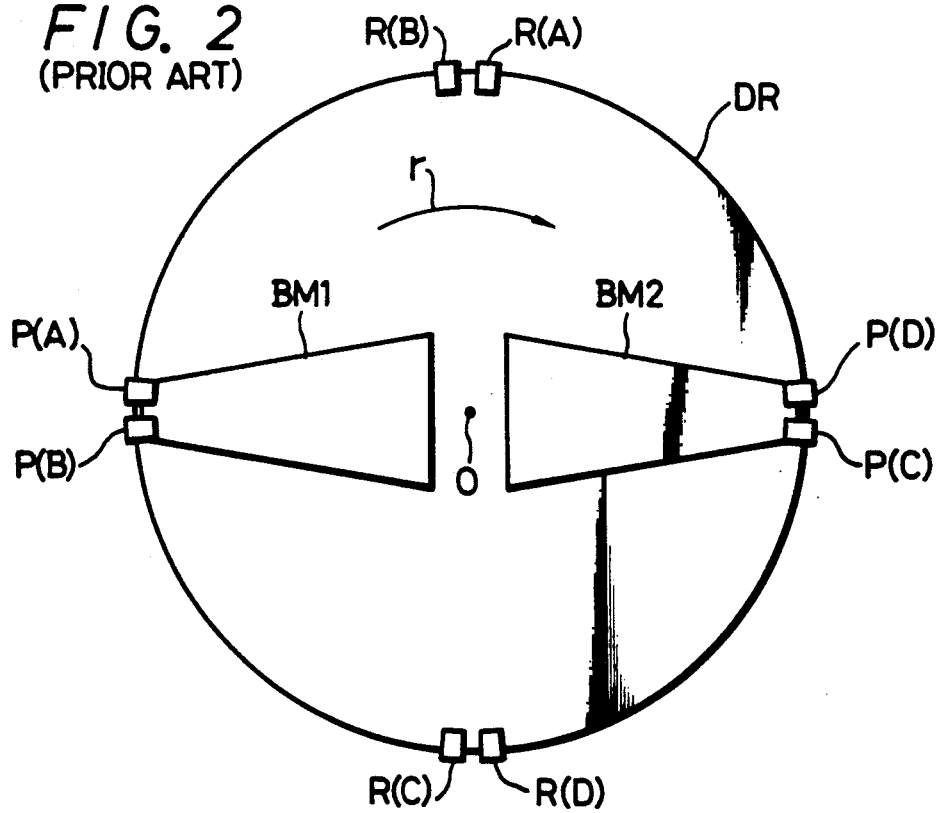
FIG. 2 is a schematic plan view of a rotary magnetic head assembly of a 4:2:2 component digital video tape recorder according to the prior art.
Figure 4:
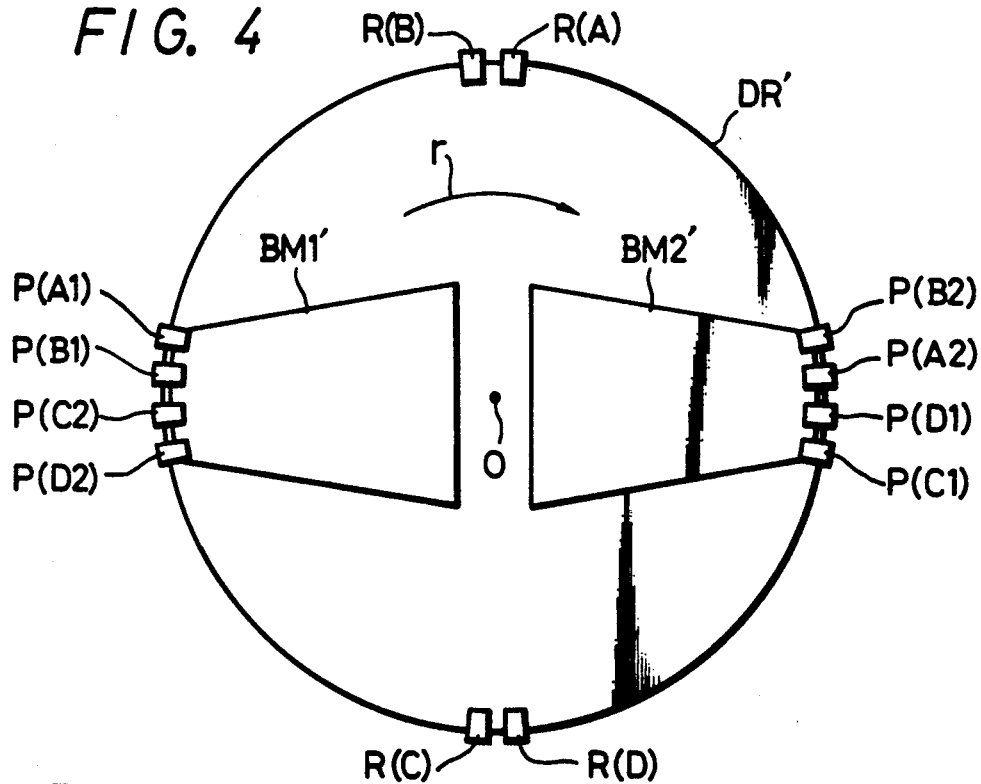
FIG. 4 is a schematic view similar to that of FIG. 2, but showing a rotary head assembly of a digital video tape recorder in accordance with an embodiment of the present invention.

Referring now to FIG. 4, it will be seen that the present invention is there shown applied to the rotary magnetic head assembly of a 4:2:2 component digital video tape recorder according to the SMPTE D-1 format. The rotary magnetic head assembly shown on FIG. 4 is generally similar to the rotary magnetic head assembly according to the prior art, as shown on FIG. 2 and has its corresponding parts identified by the same reference letters. Thus, in the rotary magnetic head assembly of a digital video tape recorder embodying this invention, a rotary drum DR' rotated in the direction of the arrow r has a first pair of recording heads R(A) and R(B) and a second pair of recording heads R(C) and R(D) which are fixedly mounted at diametrically opposed locations on the periphery of the drum DR'. Once again, bimorph leaves BM1' and BM2' are mounted on the rotary drum DR' in diametrically opposed directions so as to locate respective reproducing magnetic heads at substantially equally angularly spaced positions relative to the pairs of recording heads R(A), R(B) and R(C), R(D).

However, in accordance with the present invention, the number of the reproducing heads mounted on the bimorph leaves BM1' and BM2' is larger than the number of the recording heads on the rotary drum DR' for relatively reducing the maximum deflections of the reproducing heads by the bimorph leaves needed to maintain substantial tracking of the record tracks in a variable tape speed playback mode, that is, needed to ensure that each reproducing head can accurately reproduce a digital video signal recorded in the record track being scanned thereby, when reproducing is effected with the tape being transported at a speed different from that used for recording.

By way of example, in the embodiment of the invention illustrated on FIG. 4, a first set of four reproducing rotary magnetic heads P(A1), P(B1), P(C2) and P(D2) is mounted on the bimorph leaf BM1', and a second set of four reproducing rotary magnetic heads P(C1), P(D1), P(A2) and P(B2) is mounted on the bimorph leaf BM2'. The positions of the reproducing rotary magnetic heads relative to each other on each of the bimorph leaves BM1' and BM2' in the direction parallel to the axis of rotation 0 of the rotary drum DR' are determined so that, in the standard tape speed playback mode, that is, in a reproducing or playback operation during which the magnetic record tape is transported at the standard tape speed used for recording, such reproducing rotary magnetic heads will properly scan respective slant tracks recorded on the tape according to the SMPTE D-1 format for the 4:2:2 component digital video tape recorder.

Figure 3:
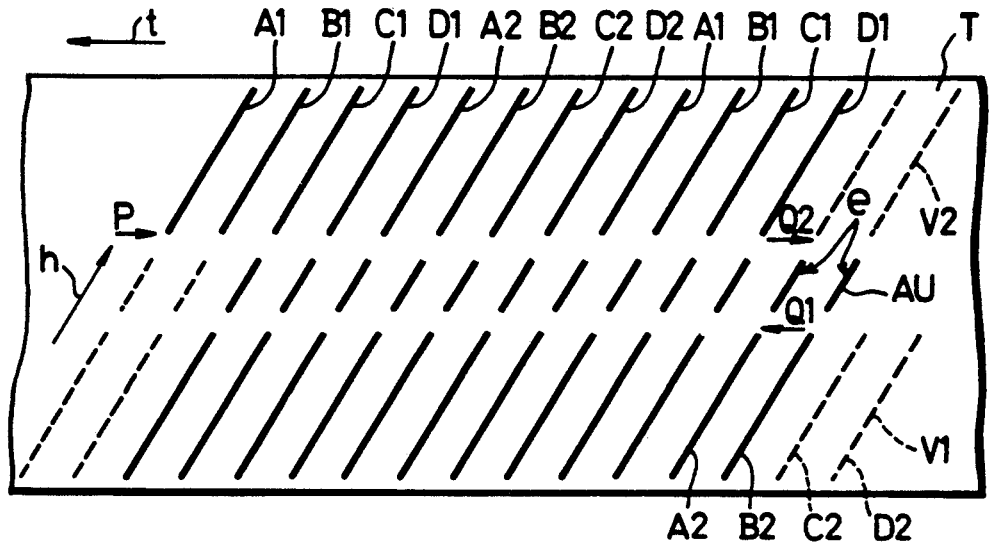
FIG. 3 is a diagrammatic view similar to that of FIG. 1, and to which reference will be made in explaining problems encountered in the operation of the 4:2:2 component digital video tape recorder which has the prior art head assembly illustrated on FIG. 2.

More specifically, during a first portion of a revolution of the drum DR', the reproducing rotary magnetic heads P(A1), P(B1), P(C2) and P(D2) simultaneously scan the slant tracks A1, B1, C1 and D1, respectively, on FIG. 3, and, during a second portion of the same revolution of the drum DR', the reproducing rotary magnetic heads P(C1), P(D1), P(A2) and P(B2) simultaneously scan the slant tracks C1, D1, A2 and B2, respectively. In a digital video tape recorder, when data having the same address are reproduced a number of times, for example, when the video data recorded in the slant tracks C1 and D1 are reproduced by the heads P(C2) and P(D2), and then again by the heads P(C1) and P(D1), respectively, true data takes priority over false data. Therefore, if an error occurs for a reason other than dropout in the playback mode, the plural reproduction of the data having the same address serves to substantially improve or reduce the final error rate.

The rotational speed of the rotary drum DR' of the rotary magnetic head assembly embodying this invention is selected to be the standard rotational speed of 9,000 r.p.m., or 150 r.p.s., and the magnetic tape has a wrapping angle about the rotary tape guide drum DR' of 257.7 degrees.

In the variable tape speed playback mode, the reproducing rotary magnetic heads P(A1), P(B1), P(C2) and P(D2) and the reproducing rotary magnetic heads P(C1), P(D1), P(A2) and P(B2) can be displaced transversely across the slant tracks by the bimorph leaves BM1' and BM2', respectively, so that, in the course of one revolution of the drum DR', eight successive slant tracks A1, B1, C1, D1, A2, B2, C2 and D2 are scanned. Accordingly, it will be possible to reproduce the digital video signal for one field in the course of two revolutions of the drum DR'. Since the rotational speed of the drum DR' is 9,000 r.p.m., that is, 150 r.p.s., as in the previously described prior art, the rotary drum DR', and the rotary magnetic heads thereon, undergo three revolutions during one field period of the PAL or 625/50-system. Therefore, the reproducing rotary magnetic heads on the drum DR' effect one revolution more during each field period then is required for the playback or reproducing of the digital video data for that field.

The operation of the apparatus embodying this invention in its twice normal tape speed playback mode will now be described with reference to FIGS. 3, 4 and 5. More specifically, in the twice normal tape speed playback mode, as the head-carrying drum DR' is rotated, the reproducing rotary magnetic heads P(A1), P(B1), P(C2) and P(D2), and the reproducing rotary magnetic heads P(C1), P(D1), P(A2) and P(B2) are changeably displaced by the bimorph leaves BM1' and BM2', respectively, in the direction transverse to the tracks by the displacement amounts shown on FIG. 5 for the bimorph leaf BM1' and hereinafter further described in detail so as to accurately scan or track the respective slant tracks.

During a first revolution of the rotary drum DR', the reproducing rotary magnetic heads P(A1), P(B1), P(C2) and P(D2) simultaneously scan the first to fourth slant tracks A1, B1, C1 and D1, counted from the left-hand side of FIG. 3, while such reproducing rotary magnetic heads move about the peripheral portion of the drum DR' on which the tape T is wrapped. Then, during that portion of the first revolution of the rotary drum DR' in which the reproducing rotary magnetic heads P(C1), P(D1), P(A2) and P(B2) move about that portion of the periphery of the drum on which the tape T is wrapped, the reproducing rotary magnetic heads P(C1), P(D1), P(A2) and P(B2) simultaneously scan the fifth to eighth slant tracks A2, B2, C2 and D2, again counted from the left-hand side of FIG. 3. During the next revolution of the rotary drum DR', the reproducing rotary magnetic heads P(A1), P(B1), P(C2) and P(D2) simultaneously scan the ninth to twelfth slant tracks A1, B1, C1 and D1 counted from the left-hand side of FIG. 3, and then the reproducing rotary magnetic heads P(C1), P(D1), P(A2) and P(B2) simultaneously scan the thirteenth to sixteenth slant tracks A2, B2, C2, and D2 again counted from the left-hand side of FIG. 3.

It will be appreciated from the above that, when the head-carrying drum DR' is rotated twice, that is, during only ⅔ of a field period of the video signal according to the PAL system, the reproducing rotary magnetic heads P(A1), P(B1), P(C2), P(D2), P(C1), P(D1), P(A2) and P(B2) scan a total of sixteen slant tracks. Therefore, during two revolutions of the drum DR', one field of the digital video signal comprised of a digital luminance signal and digital red and blue chrominance difference signals, recorded in twelve slant tracks, can be readily reproduced.

Figure 5:
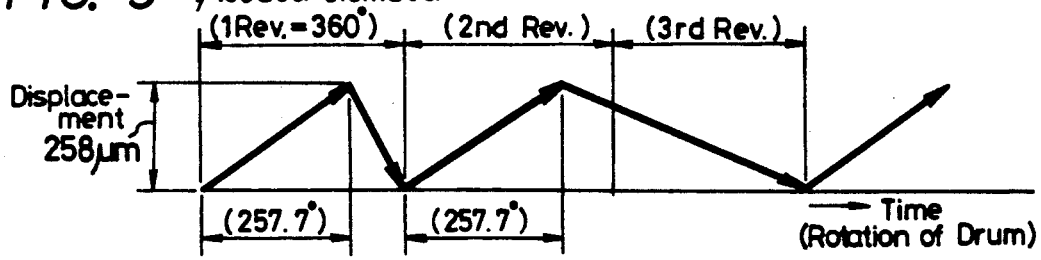
FIG. 5 is a graphic representation to which reference will be made in explaining how the rotary head assembly of FIG. 4 avoids problems associated with the prior art.

Referring now to FIG. 5 which illustrates the amount of displacement of the bimorph leaf BM1' with time, it will be seen that, since the drum DR' rotates three times during a field period (1/50 sec.) of a PAL video signal, the time required for the first revolution of the drum DR' is 1/150 sec. or 6.6 msec. Since the magnetic tape T is transported through a distance corresponding to the overall pitch of twelve slant tracks when recording one field of a PAL video signal, it will be apparent that the magnetic tape is transported through a distance equivalent to the overall pitch of twenty four slant tracks during a field period in the twice normal tape speed playback mode. As a result, during one revolution of the head-carrying drum DR' in the twice normal tape speed playback mode, the magnetic tape T is transported through a distance corresponding to the overall pitch of eight slant tracks. Accordingly, during the initial 257.7 degrees of the first revolution of the head-carrying drum DR', the reproducing rotary magnetic heads P(A1), P(B1), P(C2) and P(D2) respectively scan the first to fourth slant tracks A1, B1, C1 and D1, respectively, counted from the left-hand side of FIG. 3, while the bimorph leaf BM1' is progressively flexed to maintain a properly tracked condition, and then, during the remainder of the first revolution of the drum DR', the reproducing rotary magnetic heads P(A1), P(B1), P(C2) and P(D2) scan the starting portions of the ninth to twelfth slant tracks A1, B1, C1 and D1, respectively, counted from the left-hand side of FIG. 3 while the amount of flexing or displacement of the bimorph leaf BM1' is progressively reduced to 0.

In the case of the SMPTE D-1 format for recording a PAL video signal, the amount of displacement of the bimorph leaf BM1' is shown on FIG. 5 to increase, during the initial 257.7 degrees of the revolution, from 0 to a maximum displacement of 258 micrometers. Such maximum displacement is determined from $8 \times (257.7/360) = 5.7$ tracks which each have a track pitch of 45 micrometers. Therefore, $45 \times 5.7 = 258$ micrometers. Thereafter, that is, during the further turning of the drum DR' through 102.3 degrees for completing the first revolution, the displacement of the bimorph leaf BM1' is shown to be decreased progressively from 258 micrometers to 0.

During the next revolution of the head-carrying drum DR' in the twice normal tape speed playback mode, the magnetic tape T is further transported through a distance corresponding to the overall pitch of 8 slant tracks. While turning through the initial 257.7 degrees of the second revolution of the drum DR', the displacement of the bimorph leaf BM1' again increases progressively from 0 to a maximum displacement of 258 micrometers (equivalent to the overall pitch of 5.7 tracks) so that the reproducing rotary magnetic heads P(A1), P(B1), P(C2) and P(D2) scan the ninth to twelfth slant tracks A1, B1, C1 and D1, counted from the left-hand side of FIG. 3, with the properly tracked condition occurring during such scanning due to the described progressive displacement or flexing of the bimorph leaf BM1'.

After the reproducing rotary magnetic heads P(A1), P(B1), P(C2) and P(D2) have scanned the ninth to twelfth slant tracks A1, B1, C1 and D1 while turning through the initial 257.7 degrees of the second revolution of the drum DR', such heads P(A1), P(B1), P(C2) and P(D2) arrive at the starting portions of the seventeenth to twentieth slant tracks A1, B1, C1 and D1, respectively, also counted from the left-hand side of FIG. 3. However, as earlier noted, in the next or third revolution of the rotary head-carrying drum DR' the reproducing rotary magnetic heads P(A1), P(B1), P(C2) and P(D2) do not need to reproduce the digital video signal recorded in the seventeenth to twentieth slant tracks A1, B1, C1 and D1. Therefore, during the last 102.3 degrees of the second revolution of the drum DR' and during the third revolution thereof, which completes the time required for one field period of the PAL video signal, tracking need not be maintained and the displacement of the heads P(A1), P(B1), P(C2) and P(D2) by the bimorph leaf BM1' is gradually reduced from 258 micrometers to 0, as shown on FIG. 5.

It will be appreciated that the flexing or change of displacement of the bimorph leaf BM2, and hence the tracking movements of the reproducing rotary magnetic heads P(C1), P(D1), P(A2) and P(B2) mounted thereon, are similar to those shown on FIG. 5 for the bimorph leaf BM1', except that the waveform representing the displacements of the bimorph leaf BM2' is offset by 3.3 msec., that is, by 180 degrees, relative to the waveform shown on FIG. 5.

If the tape speed in the variable tape speed playback mode is a fractional amount greater than the normal tape speed, such as, 1.9 times the normal playback tape speed, the maximum displacement of the bimorph leaf BM1' or BM2' required for maintaining accurate tracking of the slant tracks by the respective reproducing rotary magnetic heads is 438 micrometers, that is, 258 micrometers plus 4 times 45 micrometers. Even in the case of the three times normal tape speed playback mode, the maximum displacement of each of the bimorph leaves BM1' and BM2' required to maintain proper tracking is 750 micrometers.

Therefore, by increasing, from 4 to 8, the number of the reproducing rotary magnetic heads carried by the bimorph leaves BM1' and BM2' in a digital video tape recorder according to an embodiment of the present invention, accurate tracking can be maintained even when the tape speed employed during playback is varied in the range from −1 to +3 times the normal tape speed, and even when the bimorph leaves are of standard size, that is, of a size suitable for use in an SMPTE D-1 format 4:2:2 component digital video tape recorder (DVTR).

When the number of the reproducing rotary magnetic heads mounted on the bimorph leaves or other head moving devices is increased from 4 to 8, as in the above described embodiment of the invention, the storage capacity of the memory conventionally employed in the reproduced signal processing section of the DVTR has to be increased as compared with the storage capacity of the memory that is required when only 4 reproducing rotary magnetic heads are employed. However, such increase in the capacity of the memory that is required in a DVTR according to the present invention is less than the increase in storage capacity of the memory required when the number of reproducing rotary magnetic heads is increased but such reproducing rotary magnetic heads are fixedly mounted on the head carrying rotary tape guide drum.

Since a twofold increase in the number of reproducing rotary magnetic heads mounted on the bimorph leaves in accordance with the present invention is sufficient to obtain the described advantages thereof, such advantages can be achieved without unduly complicating the arrangement of the rotary magnetic head assembly.

Further, since the reproducing rotary magnetic heads in a DVTR embodying the present invention twice scan the slant tracks on the magnetic tape in the standard playback mode, that is, when the tape is transported at the normal tape speed during playback, it is possible to considerably improve or reduce the random error rate in the reproduced video signal data.

Since the rotational speed of the rotary head-carrying drum DR' in the DVTR embodying this invention need not be increased, that is, is maintained at the standard three revolutions for each field period of the PAL system, the disadvantages resulting from increased centrifugal forces due to increased rotational speeds are not encountered.

Furthermore, when the digital video signal for one field period is reproduced in the variable tape speed playback mode, the time necessary for such playback is less than one field period, thereby making it possible to decrease the rate at which the displacement of each of the bimorph leaves BM1' and BM2' is restored to 0 or changed. Moreover, by reason of the fact that the digital video signal for one field is reproduced in the variable tape speed playback mode in a time shorter than one field period, when a variable tape speed playback is to be started from a desired position on the magnetic tape, even if the reproducing rotary magnetic heads are initially distant from the slant tracks to be scanned by such heads at such desired starting position, it is possible for the reproducing rotary magnetic heads to merely await the arrival of the slant tracks to be scanned while the magnetic tape is transported without the playback of the video signals therefrom.

In the Japanese Laid-Open Patent Gazette No. 61-150476 there are disclosed techniques for reducing the required amount of displacement of a bimorph leaf supporting the reproducing rotary magnetic heads in a DVTR when in the reverse variable tape speed playback mode. Such techniques can be readily combined with the present invention for further increasing the range of tape speeds over which reverse playback is possible without unduly increasing the required amount of displacement of the bimorph leaves.

By way of summary, it is to be noted that, in accordance with the present invention, it is possible to obtain a relatively simplified apparatus for reproducing digitally recorded video and audio signals, and in which the required displacement of bimorph leaves or other devices for mounting the reproducing rotary magnetic heads can be reduced, and further in which the video signal digitally recorded on the tape or other record medium can be reproduced in a variable tape speed playback mode with a tape speed varying over a relatively wide range.

Although a preferred embodiment of the invention has been described in detail herein with reference to the accompanying drawings, it is to be understood that the invention is not limited to that precise embodiment, and that many changes and modifications can be effected therein by one skilled in the art without departing from the spirit and scope of the invention as defined in the appended claims.

What is claimed is:

1. An apparatus for digitally recording and reproducing video and audio signals in successive parallel tracks on a record tape while the latter is advanced in a longitudinal direction at an angle to the direction along said tracks, said apparatus comprising:

a rotary drum;
first transducing means mounted on said rotary drum and operative in a recording mode for recording the video and audio signals in a digital form on said record tape, said first transducing means including first and second pluralities of recording heads fixedly mounted on said rotary drum at diametrically opposed positions so that one field of the video and audio signals is recorded in a plurality of parallel record tracks of a predetermined pitch scanned by said first and second pluralities of recording heads as the record tape is advanced at a predetermined speed in said longitudinal direction;
first and second bimorph leaves mounted at respective opposed positions on said rotary drum intermediate said positions at which said first and second pluralities of recording heads are mounted; and
second transducing means operative in a reproducing mode and being mounted on said bimorph leaves for scanning said parallel tracks, said second transducing means including first and second pluralities of reproducing heads mounted on said first and second bimorph leaves, respectively, so that each of said first and second pluralities of reproducing heads can be deflected by the respective one of said first and second bimorph leaves in a direction transverse to said direction along the tracks when, in said reproducing mode, the tape is advanced at a speed different from said predetermined speed, the number of said reproducing heads in each of said first and second pluralities thereof being larger than the number of said recording heads in each of said first and second pluralities of recording heads for relatively reducing the maximum deflections of said reproducing heads by said bimorph leaves needed to ensure that each of the reproducing heads can accurately reproduce a digital video signal recorded in one of the record tracks being scanned thereby when the record tape is advanced at said different speed.

2. The apparatus according to claim 1; in which there are four of said recording heads arranged in pairs at said opposed positions, respectively.

3. The apparatus according to claim 2; in which each of said first and second pluralities of reproducing heads includes four reproducing heads so that there are a total of eight of said reproducing heads.

4. The apparatus according to claim 3; in which said rotary drum rotates three times during one field period of said video signal so that twelve parallel video and audio tracks are formed on said record tape by said four recording heads in said recording mode for each field period of a PAL television signal.

5. The apparatus according to claim 4; in which said twelve tracks are scanned by said eight reproducing heads in the course of two rotations of said rotary drum.

6. The apparatus according to claim 3; in which said rotary drum rotates two and a half times during one field period of said video signal so that ten parallel tracks can be formed on the record tape to record one field period of a NTSC television signal.

7. The apparatus according to claim 6; in which said eight reproducing heads reproduce said ten tracks in less than said one field period.

* * * * *